United States Patent
Ajito et al.

(10) Patent No.: US 8,134,618 B2
(45) Date of Patent: Mar. 13, 2012

(54) MULTISPECTRAL IMAGE CAPTURING APPARATUS

(75) Inventors: Takeyuki Ajito, Hachioji (JP); Toru Wada, Niiza (JP); Yasuhiro Komiya, Hino (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 12/959,074

(22) Filed: Dec. 2, 2010

(65) Prior Publication Data

US 2011/0074992 A1    Mar. 31, 2011

Related U.S. Application Data

(60) Division of application No. 12/556,437, filed on Sep. 9, 2009, now Pat. No. 7,868,936, which is a division of application No. 11/416,939, filed on May 3, 2006, now Pat. No. 7,612,822, which is a continuation of application No. PCT/JP2004/016678, filed on Nov. 10, 2004.

(30) Foreign Application Priority Data

Nov. 11, 2003    (JP) .................................. 2003-381419

(51) Int. Cl.
  H04N 3/14      (2006.01)
  H04N 5/335     (2011.01)
  H04N 9/04      (2006.01)
  H04N 9/083     (2006.01)
(52) U.S. Cl. ...................................... 348/278; 348/222.1
(58) Field of Classification Search .................. None
  See application file for complete search history.

(56) References Cited

U.S. PATENT DOCUMENTS

| 4,517,588 | A |   | 5/1985  | Kuwayama et al. |
|-----------|---|---|---------|-----------------|
| 4,668,975 | A |   | 5/1987  | Kuwayama et al. |
| 5,063,439 | A |   | 11/1991 | Tabei           |
| 5,668,597 | A |   | 9/1997  | Parulski et al. |
| 5,864,364 | A |   | 1/1999  | Ohyama et al.   |
| 5,982,497 | A |   | 11/1999 | Hopkins         |
| 6,150,930 | A | * | 11/2000 | Cooper .................. 340/435 |
| 6,215,597 | B1|   | 4/2001  | Duncan et al.   |
| 6,466,334 | B1|   | 10/2002 | Komiya et al.   |
| 6,515,275 | B1| * | 2/2003  | Hunter et al. ................. 250/226 |
| 6,885,394 | B1|   | 4/2005  | Noguchi         |

(Continued)

FOREIGN PATENT DOCUMENTS

EP    1 255 410 A2    11/2002

(Continued)

OTHER PUBLICATIONS

Lidan Miao; Hairong Qi; Snyder, W.E.; , "A generic method for generating multispectral filter arrays," Image Processing, 2004. ICIP '04. 2004 International Conference on , vol. 5, no., pp. 3343-3346 vol. 5, Oct. 24-27, 2004.*

(Continued)

Primary Examiner — Lin Ye
Assistant Examiner — Dennis Hogue
(74) Attorney, Agent, or Firm — Holtz, Holtz, Goodman & Chick, PC (57) ABSTRACT

A multispectral image capturing apparatus has different spectral sensitivity characteristics of at least four bands. Three primary bands of the at least four bands have spectral sensitivity characteristics of standard RGB. At least one auxiliary band of the rest of the at least four bands excluding the three primary bands has a spectral sensitivity characteristic of a narrower bandwidth than bandwidths of the RGB.

2 Claims, 10 Drawing Sheets

U.S. PATENT DOCUMENTS

| | | | |
|---|---|---|---|
| 7,095,443 | B2 | 8/2006 | Yoshikawa |
| 7,148,920 | B2 | 12/2006 | Aotsuka |
| 2002/0071605 | A1 | 6/2002 | Iida et al. |
| 2002/0140822 | A1* | 10/2002 | Kahn et al. ............... 348/207.99 |
| 2002/0163583 | A1 | 11/2002 | Jones |
| 2003/0001104 | A1 | 1/2003 | Sendai et al. |
| 2003/0013937 | A1 | 1/2003 | Tsujita et al. |
| 2003/0160888 | A1 | 8/2003 | Yoshikawa |
| 2003/0176768 | A1 | 9/2003 | Gono et al. |
| 2004/0095489 | A1 | 5/2004 | Hirose |
| 2004/0165276 | A1 | 8/2004 | Yahagi et al. |
| 2004/0186351 | A1* | 9/2004 | Imaizumi et al. ............. 600/160 |
| 2004/0257447 | A1 | 12/2004 | Ohsawa et al. |
| 2005/0212934 | A1 | 9/2005 | Hoshuyama |
| 2005/0285966 | A1* | 12/2005 | Bamji et al. ................. 348/336 |
| 2006/0241349 | A1 | 10/2006 | Gono |
| 2006/0279647 | A1 | 12/2006 | Wada et al. |
| 2008/0281154 | A1 | 11/2008 | Gono et al. |
| 2008/0294105 | A1 | 11/2008 | Gono et al. |

FOREIGN PATENT DOCUMENTS

| | | |
|---|---|---|
| EP | 1 302 152 A1 | 4/2003 |
| JP | 58-21989 A | 2/1983 |
| JP | 03-174890 A | 7/1991 |
| JP | 06-202250 A | 7/1994 |
| JP | 2001-016598 A | 1/2001 |
| JP | 2002-034908 A | 2/2002 |
| JP | 2002-296114 A | 10/2002 |
| JP | 2002-300589 A | 10/2002 |
| JP | 2003-023643 A | 1/2003 |
| JP | 2003-087806 A | 3/2003 |
| JP | 2003-259380 A | 9/2003 |
| JP | 2004-172832 A | 6/2004 |
| JP | 2004-200357 A | 7/2004 |
| JP | 2004-228662 A | 8/2004 |
| JP | 2005-033609 A | 2/2005 |

OTHER PUBLICATIONS

Lidan Miao; Hairong Qi; Snyder, W.E.; , "A generic method for generating multispectral filter arrays," Image Processing, 2004. ICIP '04. 2004 International Conference on , vol. 5, no., pp. 3343-3346 vol. 5, Oct. 24-27, 2004.*

Hiroshi Ishimaru et al, "Fukusu no RGB Camera o Mochiita One Shot-gata Multiple Spectra Camera no Kaihatsu," Dai 61 Kai Extended Abstracts; Japan Society of Applied Physics, Sep. 3, 2000, vol. 3, p. 887.

International Preliminary Report on Patentability and Written Opinion dated Jul. 24, 2006 (7 sheets), issued in International Application No. PCT/JP2004/016678, filed Nov. 10, 2004.

Supplementary European Search Report dated May 8, 2009 (5 pages), issued in counterpart European Application No. 04799576.6.

Japanese Office Action dated Aug. 10, 2010, and English translation thereof, issued in counterpart Japanese Application No. 2008-043506.

* cited by examiner

MULTISPECTRAL IMAGE CAPTURING APPARATUS

CROSS-REFERENCE TO RELATED APPLICATIONS

This application is a Divisional Application of U.S. application Ser. No. 12/556,437, filed Sep. 9, 2009 now U.S. Pat. No. 7,868,936, which is a Divisional Application of U.S. application Ser. No. 11/416,939, filed May 3, 2006, now U.S. Pat. No. 7,612,822, issued Nov. 3, 2009, which is a Continuation Application of PCT Application No. PCT/JP2004/016678, filed Nov. 10, 2004, which was published under PCT Article 21(2) in Japanese, and which is based upon and claims the benefit of priority from prior Japanese Patent Application No. 2003-381419, filed Nov. 11, 2003, the entire contents of all of which are incorporated herein by reference.

BACKGROUND OF THE INVENTION

1. Field of the Invention

This invention relates to a multispectral image capturing apparatus capable of capturing an image of at least four bands, each of which has a different spectral characteristic.

2. Description of the Related Art

Conventionally, an RGB (three-band) camera has been widely used for capturing images of a subject.

In recent years, to enable an image capturing apparatus to accurately reproduce colors of a subject, there has been proposed a method of obtaining and recording more detailed spectral information of the subject in the form of images by using a multispectral camera capable of capturing images of at least four bands. Methods relating to such an image capturing apparatus capable of capturing images of at least four bands are disclosed in U.S. Pat. Nos. 5,864,364; 6,466,334; Jpn. Pat. Appln. Publication No. 2002-296114; Jpn. Pat. Appln. Publication No. 2003-023643; and Jpn. Pat. Appln. Publication No. 2003-087806, for example.

According to the methods disclosed in these documents, a filter having a transmittance characteristic of narrower bands than wavelength bandwidths of RGB is placed in front of a CCD image capturing device to obtain the more detailed spectral information of the subject.

BRIEF SUMMARY OF THE INVENTION

According to a first aspect of the present invention, there is provided a multispectral image capturing apparatus having different spectral sensitivity characteristics of at least four bands, comprising:

spectral sensitivity characteristics of three primary bands of the at least four bands having spectral sensitivity characteristics of standard RGB; and spectral sensitivity characteristic of at least one auxiliary band of the rest of the at least four bands excluding the three primary bands having a spectral sensitivity characteristic of a narrower bandwidth than bandwidths of the RGB.

According to a second aspect of the present invention, there is provided a multispectral image capturing apparatus, comprising:

a half mirror configured to divide light from an image capturing lens into two light paths;

a band-pass filter configured to modulate a spectral characteristic of one portion of the light divided by the half mirror;

an image capturing unit configured to receive the light modulated by the band-pass filter and capture an image of a subject; and a color image capturing unit configured to receive the other portion of the light divided by the half mirror as three decomposed colors of red, blue, and green and capture a color image of the subject.

According to a third aspect of the present invention, there is provided a multispectral image capturing apparatus having different spectral sensitivity characteristics of at least four bands, comprising:

a dichroic mirror configured to have a comb-shaped spectral transmittance characteristic and a comb-shaped spectral reflectance characteristic, transmit light of a plurality of wavelength bandwidths, and reflect light of bandwidths other than the plurality of wavelength bandwidths;

a band-pass filter configured to have a transmissive wavelength bandwidth substantially similar to a transmissive wavelength bandwidth of the dichroic mirror; and a band-pass filter configured to have a spectral transmittance characteristic of transmitting light of a wavelength bandwidth substantially equal to a reflective wavelength bandwidth of the dichroic mirror.

According to a fourth aspect of the present invention, there is provided a multispectral image capturing apparatus, comprising:

half mirror means for dividing light from an image capturing lens means into two light paths;

band-pass filtering means for modulating a spectral characteristic of one portion of the light divided by the half mirror means;

image capturing means for receiving the light modulated by the band-pass filtering means and capturing an image of a subject; and color image capturing means for receiving the other portion of the light divided by the half mirror means as three decomposed colors of red, blue, and green and capturing a color image of the subject.

According to a fifth aspect of the present invention, there is provided a multispectral image capturing apparatus having different spectral sensitivity characteristics of at least four bands, comprising:

dichroic mirror means, having a comb-shaped spectral transmittance characteristic and a comb-shaped spectral reflectance characteristic, for transmitting light of a plurality of wavelength bandwidths and reflecting light of bandwidths other than the plurality of wavelength bandwidths;

band-pass filtering means having a transmissive wavelength bandwidth substantially similar to a transmissive wavelength bandwidth of the dichroic mirror means; and band-pass filtering means having a spectral transmittance characteristic of transmitting light of a wavelength bandwidth substantially equal to a reflective wavelength bandwidth of the dichroic mirror means.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

First Embodiment

Now, the present invention will be described below by referring to the accompanying drawings that illustrate preferred embodiments of the present invention.

Figure 1:
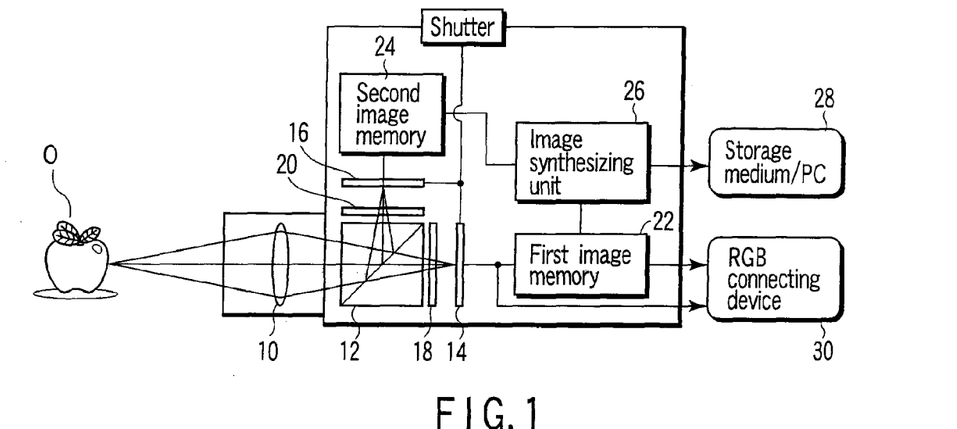
FIG. 1 is a diagram illustrating a configuration of a multispectral image capturing apparatus according to a first embodiment of the present invention.
Figure 2:
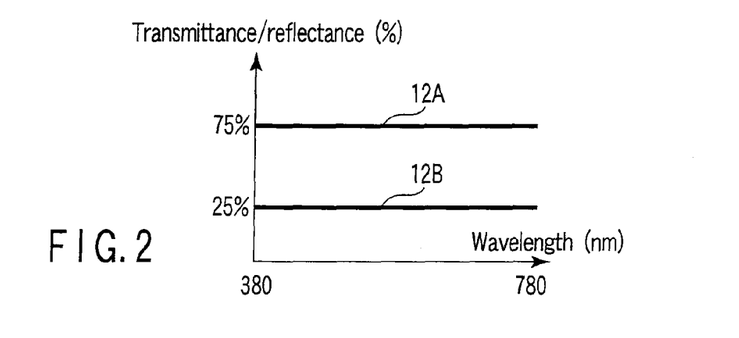
FIG. 2 is a graph representing a transmittance characteristic and a reflectance characteristic of the half mirror used in the multispectral image capturing apparatus according to the first embodiment.

In a multispectral image capturing apparatus according to a first embodiment of the present invention, as illustrated in FIG. 1, light from a subject O is transmitted through a lens 10 and a half mirror (HM) 12 and is formed into images on color CCD image capturing devices 14 and 16. Transmittance and reflectance of the half mirror 12 used in this example are not equal in proportion. Their ratio is approximately three to one. That is, as illustrated in FIG. 2, the half mirror 12 includes a transmittance 12A, which is constantly 75% irrespective of the wavelength, and a reflectance 12B, which is constantly 25% irrespective of the wavelength.

Figure 3:
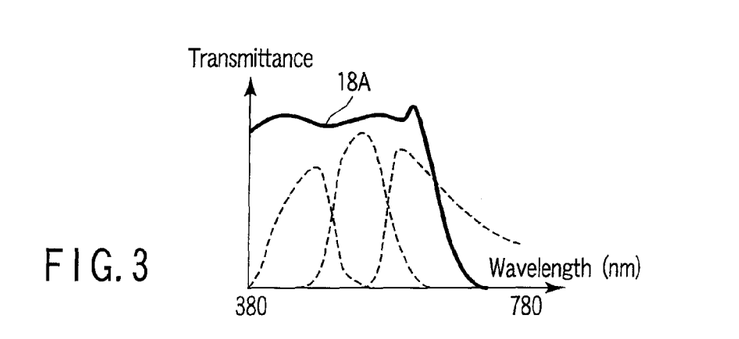
FIG. 3 is a graph representing a spectral transmittance characteristic of the infrared light cut filter used in the multispectral image capturing apparatus according to the first embodiment, and spectral sensitivity characteristics of RGB three bands of the color CCD image capturing device used in the multispectral image capturing apparatus.

A larger (i.e., a transmission-side) portion of the light divided by the half mirror 12 is filtered through an infrared light cut filter (IR-CF) 18 as shown in FIG. 3. Thereby, a near-infrared light is blocked, and a resultant light is formed into an image on the color CCD image capturing device 14. In FIG. 3, a solid line 18A indicates a spectral transmittance of the IR-CF 18.

Meanwhile, a smaller (i.e., a reflection-side) portion of the light divided by the half mirror 12 is filtered through a band-pass filter 20, and a resultant light is formed into an image on the color CCD image capturing device 16.

Figure 4:
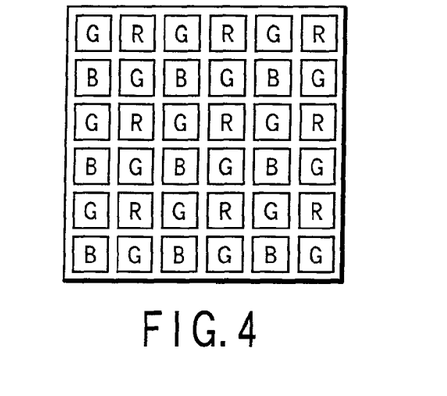
FIG. 4 is a diagram illustrating a configuration of pixels included in the color CCD image capturing device used in the multispectral image capturing apparatus according to the first embodiment.

As illustrated in FIG. 4, each of the color CCD image capturing devices 14 and 16 is a single plate-type color CCD image capturing device in which color filters of R, G, B are arranged in the Bayer pattern for respective pixels. The spectral transmittances of the respective filters of R, G, B have spectral shapes as indicated by broken lines shown in FIG. 3.

Figure 5:
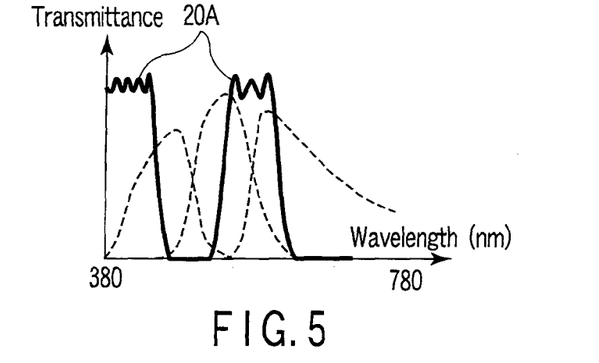
FIG. 5 is a graph representing a spectral transmittance characteristic of the band-pass filter used in the multispectral image capturing apparatus according to the first embodiment, and the spectral sensitivity characteristics of the RGB three bands of the color CCD image capturing device used in the multispectral image capturing apparatus.

Further, the band-pass filter 20 has a comb-shaped spectral transmittance as indicated by a solid line 20A shown in FIG. 5. Therefore, the band-pass filter 20 transmits light of a band approximately half of each of the wavelength bandwidths of RGB indicated by the broken lines in FIG. 5.

Figure 6:
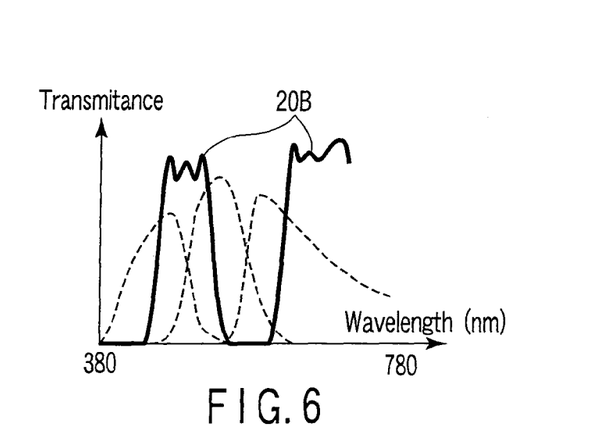
FIG. 6 is a graph representing a spectral transmittance characteristic of another band-pass filter that can be used in place of the band-pass filter of FIG. 5.

Alternatively, the band-pass filter 20 may have a comb-shaped spectral transmittance as indicated by a solid line 20B shown in FIG. 6. The spectral transmittance characteristic indicated by the solid line 20B is the inversion of the spectral transmittance characteristic indicated by the solid line 20A of FIG. 5. Therefore, with this band-pass filter 20 having the spectral transmittance characteristic indicated by the solid line 20B, light of a near-infrared region can also be obtained.

Figure 7:
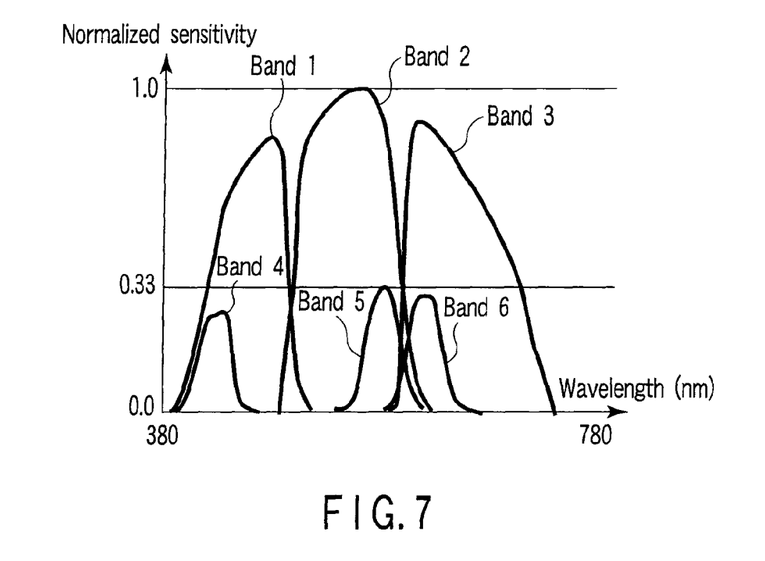
FIG. 7 is a graph representing spectral sensitivity characteristics of six bands obtained by the multispectral image capturing apparatus according to the first embodiment.

With the configuration described above, an image of three bands having spectral characteristics similar to spectral characteristics of conventional RGB is obtained at the color CCD image capturing device 14, which is provided for the transmission-side portion of the light divided by the above-described half mirror 12. Meanwhile, an image of three bands having spectral characteristics of narrower bandwidths than the conventional RGB is obtained at the color CCD image capturing device 16, which is provided for the reflection-side portion of the light. Therefore, the images of a total of six bands are obtained by the color CCD image capturing devices 14 and 16. FIG. 7 illustrates spectral sensitivity characteristics of the total of six bands thus configured. As described above, the transmittance and the reflectance of the half mirror 12 are unequal in proportion. Thus, in the spectral sensitivities of the six bands shown in FIG. 7, peak sensitivities of the latter three bands other than RGB are lower than peak sensitivities of the former three bands of RGB.

As described above, most of the incident light from the subject O is used to obtain the three bands of RGB, while the rest of the light of a small amount is subjected to a bandwidth reduction by the band-pass filter 20 and then is allocated to the other three bands. By so doing, the loss of the light amount caused by the bandwidth reduction performed by the band-pass filter 20 is reduced as much as possible, and deterioration of the sensitivity in multispectral image capturing is prevented. Accordingly, a spectral sensitivity characteristic with good color reproducibility can be obtained.

Image signal obtained by the transmission-side color CCD image capturing device 14 is temporarily stored in a first image memory 22. Meanwhile, image signal obtained by the reflection-side color CCD image capturing device 16 is temporarily stored in a second image memory 24. The three-band images stored in the first image memory 22 and the second image memory 24 are synthesized into a six-band image at an image synthesizing unit 26 and stored in a storage medium and an external PC 28. In this case, the image signals of the three bands of RGB can also be externally transmitted either directly from the transmission-side color CCD image capturing device 14 or through the first image memory 22 to be input in an RGB connecting device 30. Therefore, it is possible to connect the multispectral image capturing apparatus to a commonly used RGB monitor or the like and to use the RGB monitor as an image viewer.

The two color CCD image capturing devices 14 and 16 described in the present embodiment need not have the same resolution. For example, the reflection-side color CCD image capturing device 16 may be lower in the resolution than the transmission-side color CCD image capturing device 14. Even though the image of the three auxiliary bands obtained by the reflection-side color CCD image capturing device 16 has a low resolution, if high-frequency components in the image of the three primary bands obtained by the transmission-side color CCD image capturing device 14 are used, a multispectral image having a resolution substantially equal to a resolution of the image of the three primary bands can be obtained. A low-resolution CCD image capturing device is higher in sensitivity than a high-resolution CCD image capturing device. Thus, it is possible to decrease the reflectance of the half mirror 12 and to increase the transmittance thereof. Accordingly, overall sensitivity can be further increased.

In the present embodiment, the bandwidth reduction is performed by the band-pass filter 20. However, the present invention is not limited thereto. For example, the bandwidth reduction may be performed by other ways, such as performing the bandwidth reduction on transmission spectral characteristics of the color filers included in the color CCD image capturing device 16.

Figure 8:
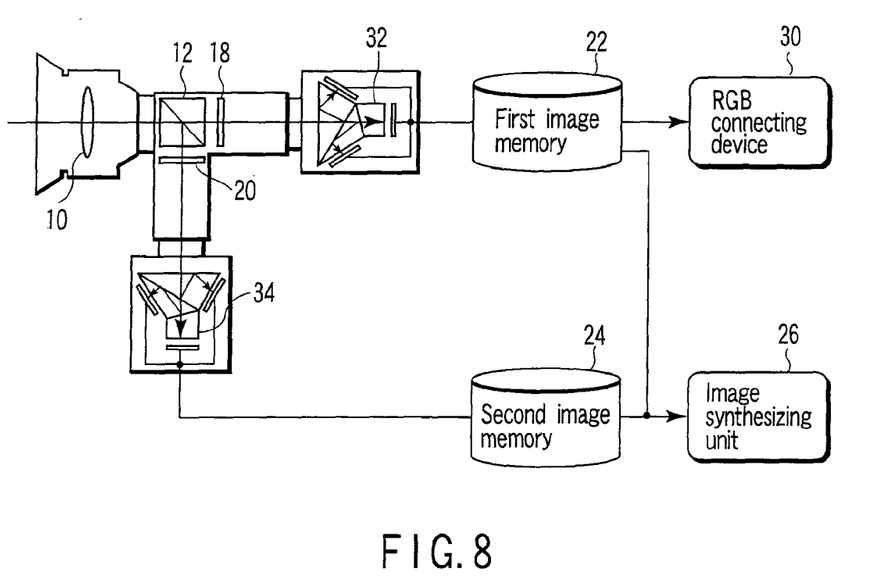
FIG. 8 is a diagram illustrating a configuration of a first modified example of the multispectral image capturing apparatus according to the first embodiment.

With reference to FIG. 8, a first modified example of the multispectral image capturing apparatus according to the first embodiment will now be described. In the present modified example, the above-described single plate-type color CCD image capturing devices 14 and 16 shown in FIG. 1 are replaced by three plate-type color image capturing units each of which includes an RGB color separation prism and three CCD image capturing devices.

That is, one portion of the light divided by the half mirror 12 with an unequal intensity ratio is incident on a color image capturing unit 32 through the IR-CF 18, and an image of the three bands of RGB is formed by the color image capturing unit 32.

Meanwhile, the other portion of the light from the subject O is subjected to the bandwidth reduction performed by the band-pass filter 20 which has the spectral transmittance as shown in FIG. 5, and then is incident on a color image capturing unit 34. Then, an image of three bands is formed by the color image capturing unit 34. Thereby, image signals of a total of six bands are obtained.

In this way, by using the three plate-type color image capturing units 32 and 34, a multispectral image of a higher resolution and a higher sensitivity can be obtained, compared with a case in which the single plate-type color CCD image capturing devices 14 and 16 are used. The three plate-type color image capturing units 32 and 34 described above are widely used in image capturing apparatuses that capture moving images, such as a conventional HDTV camera, and are effective in capturing multispectral images of moving pictures.

If an electronic shutter speed is individually determined for the CCD image capturing device included in each of the color image capturing units 32 and 34, images can be captured with optimal exposure.

Figure 9:
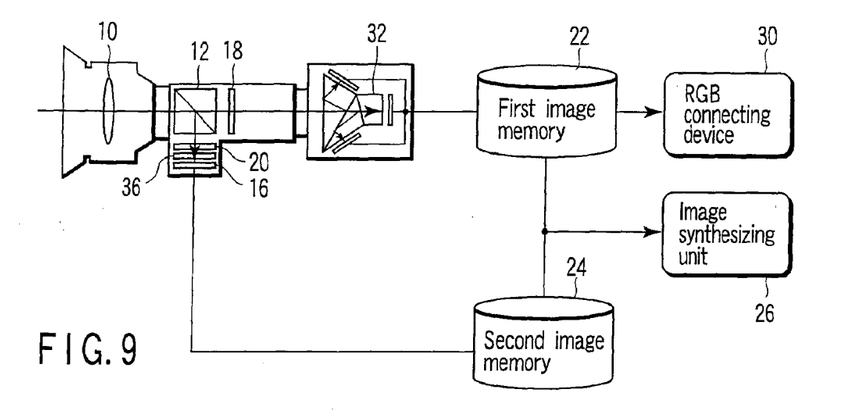
FIG. 9 is a diagram illustrating a configuration of a second modified example of the multispectral image capturing apparatus according to the first embodiment.

FIG. 9 illustrates a second modified example of the multispectral image capturing apparatus according to the first embodiment. In the present modified example, the configuration of the first embodiment described above is combined with the configuration of the first modified example.

That is, out of one portion of the light divided by the half mirror 12 with the unequal intensity ratio, light in the near-infrared region is blocked by the IR-CF 18. Thereafter, a resultant light is incident on the color image capturing unit 32 in a similar manner as in the first modified example described above. Then, the light is separated into RGB lights by the color separation prism in the color image capturing unit 32, and the RGB lights are formed into images on the respective CCD image capturing devices. Thereby, a three-band image is captured. Meanwhile, the other portion of the light is subjected to the bandwidth reduction performed by the band-pass filter 20 and an optical low-pass filter (LPF) 36, and is formed into an image on the color CCD image capturing device 16 in a similar manner as in the first embodiment described above. Thereby, a three-band image is captured. As the images are thus captured, image signals of the total of six bands are obtained. The optical LPF 36 used in this example is commonly used to decrease false colors and color moires. Therefore, although not illustrated in particular in the drawings, the optical LPF 36 is similarly provided in the first embodiment described above (and in the other embodiments later described).

As described above, in the second modified example, a multispectral image of a high resolution and a high sensitivity can be obtained by using the three plate-type color image capturing unit 32 for the three primary bands of RGB. Meanwhile, for the auxiliary three primary colors, an image is captured by the single plate-type color CCD image capturing device 16 at the cost of the resolution. As described above, however, a multispectral image of a resolution similar to the resolution obtained by the conventional three-band HDTV camera can be obtained by using the high-frequency components in the image of the three primary bands. Accordingly, a small-size multi-band image capturing apparatus can be provided.

Figure 10:
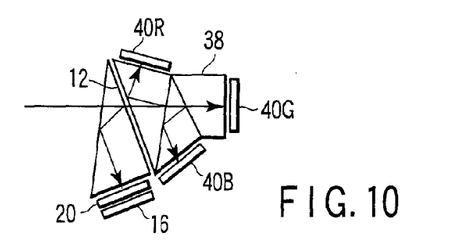
FIG. 10 is a diagram illustrating the four-component optical system of FIG. 9 in which the half mirror is combined with the color separation prism.

In FIG. 9, the half mirror 12 and the color separation prism are different elements, and the three bands at the transmission side and the three bands at the reflection side are formed by separate units, respectively. However, the present invention is not limited thereto. For example, as illustrated in FIG. 10, it is possible to capture an image of the six bands at one unit by using one device in which the half mirror 12 is combined with the color separation prism 38, one sheet of the color CCD image capturing device 16, and three monochrome CCD image capturing devices 40R, 40G, and 40B. With this configuration, it is possible to provide a six-band image capturing apparatus configured into a further smaller size.

Second Embodiment

Figure 11:
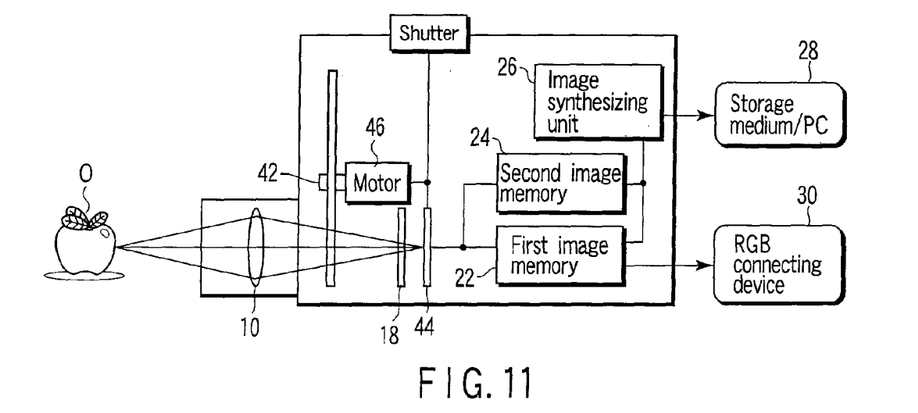
FIG. 11 is a diagram illustrating a configuration of a multispectral image capturing apparatus according to a second embodiment of the present invention.
Figure 12:
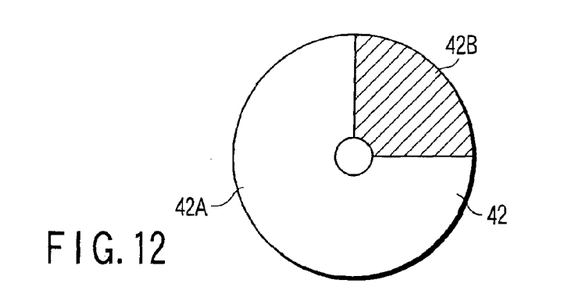
FIG. 12 is a diagram illustrating a specific structure of a rotating filter shown in FIG. 11.

In a multispectral image capturing apparatus according to a second embodiment of the present invention, as illustrated in FIG. 11, the light from the subject O is transmitted through the lens 10 and a rotating filter 42, and is formed into an image on one sheet of a color CCD image capturing device 44. As illustrated in FIG. 12, the rotating filter 42 is formed by a transparent glass 42A having a transmittance of approximately 100%, and a band-pass filter 42B having the spectral transmittance characteristic as shown in FIG. 5 described above. The rotating filter 42 is configured such that the area ratio between the transparent glass 42A and the band-pass filter 42B is approximately three to one. As the light transmitted through the rotating filter 42 is filtered through the IR-CF 18, a near-infrared light is blocked, and a resultant light is formed into an image on the color CCD image capturing device 44. Further, the rotating filter 42 is driven by a motor 46 to rotate at a constant rotation speed, and the color CCD image capturing device 44 performs exposure twice during one rotation of the rotating filter 42.

Figure 13:
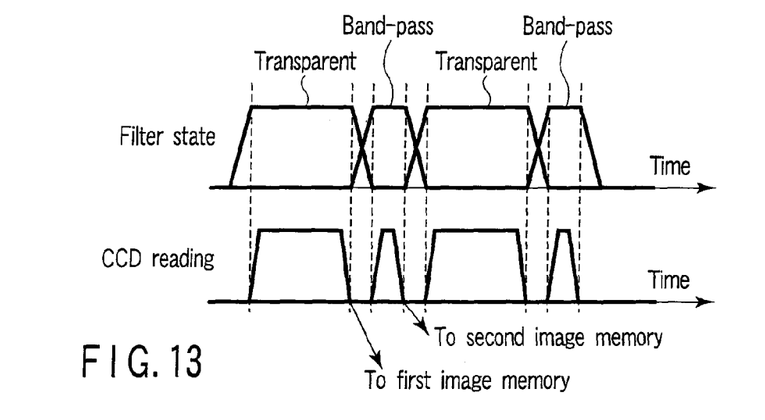
FIG. 13 is a diagram illustrating a corresponding relationship between the state of the rotating filter and timing of image reading performed by the color CCD image capturing device.

FIG. 13 is a timing chart illustrating the state of the rotating filter 42 and exposure timing of the color CCD image capturing device 44. The first exposure is performed during a state in which the transparent glass 42A of the rotating filter 42 can be used, and a resultant three-band image is stored in the first image memory 22. Further, the second exposure is performed during a state in which the band-pass filter 20 of the rotating filter 42 can be used, and a resultant three-band image is stored in the second image memory 24. Then, the respective three-band images stored in the first image memory 22 and the second image memory 24 are synthesized at the image synthesizing unit 26. Thereby, a six-band image is obtained.

With the above-described configuration, similar effects to the effects of the first embodiment can be obtained by using a smaller number of components than the components of the first embodiment. Further, if the three-band image stored in the first image memory 22 is input in the RGB connecting device 30, a color image of the subject O can be easily checked in a similar way as in the conventional RGB camera.

Third Embodiment

Figure 14:
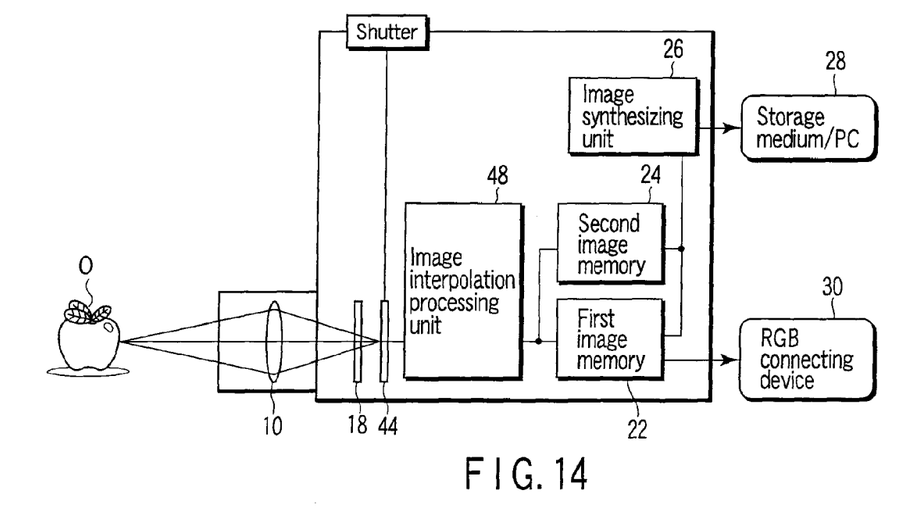
FIG. 14 is a diagram illustrating a configuration of a multispectral image capturing apparatus according to a third embodiment of the present invention.
Figure 15:
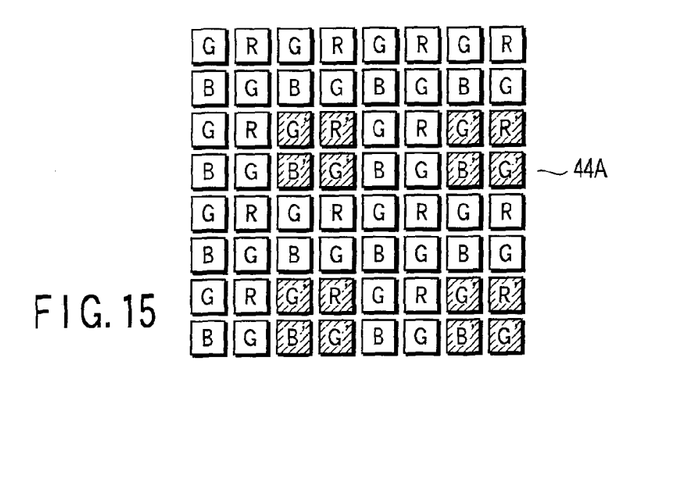
FIG. 15 is a diagram illustrating an example of filter arrangement of (a part of) a mosaic filter installed in the color CCD image capturing device shown in FIG. 14.
Figure 16:
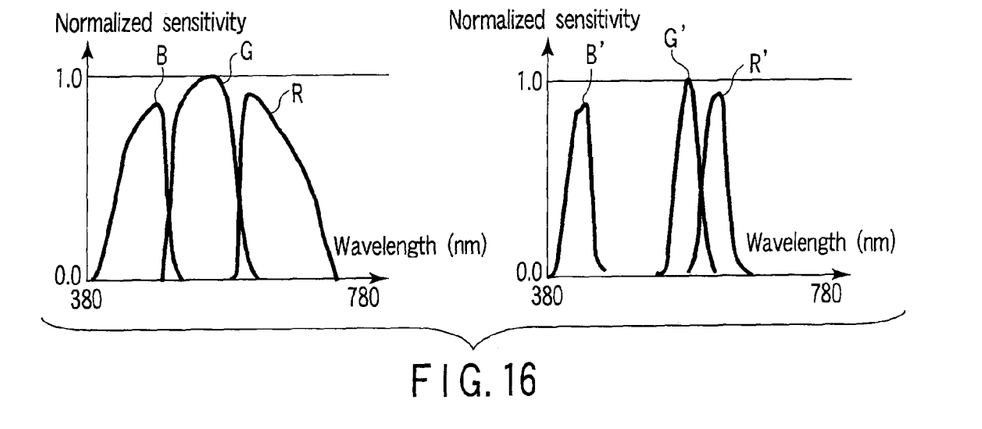
FIG. 16 is a graph representing spectral transmittance characteristics of the filters R, G, B, R', G', and B' shown in FIG. 15.

In a multispectral image capturing apparatus according to a third embodiment of the present invention, as illustrated in FIG. 14, the light from the subject O is filtered through the IR-CF 18, so that the near-infrared light is blocked. Then, an image is formed on one sheet of the color CCD image capturing device 44. In this example, as illustrated in FIG. 15, the color CCD image capturing device 44 is provided with a mosaic filter 44A in which filters R, G, B, R', G', and B' are periodically arranged for the respective pixels. Spectral transmittance distributions of the respective filters are shown in FIG. 16. That is, the filters R, G, and B have the same spectral bandwidths as the conventional three-band camera. Meanwhile, the filters R', G', and B' have narrower spectral bandwidths than the conventional RGB. In the mosaic filter 44A, as illustrated in FIG. 15, the filters are arranged at such a ratio that the filters R', G', and B' are provided for one pixel while the filters R, G, and B are provided for three pixels, and this set of arrangement is periodically repeated.

The light transmitted through the respective filters is received by the color CCD image capturing device 44 and sequentially input in an image interpolation processing unit 48 as image data. In the image interpolation processing unit 48, image data corresponding to a pixel position lacking in each of the bands is obtained by interpolation on the basis of nearby image data, and image data having the same pixel number is generated. Among the thus generated image data of the respective bands, an image of the three bands of RGB is sent to and stored in the first image memory 22, while an image of the three bands of R'G'B' is sent to and stored in the second image memory 24. If the three-band image stored in the first image memory 22 is input in the RGB connecting device 30, the color image of the subject O can be easily checked in the similar way as in the conventional RGB camera. Further, it is possible to obtain a six-band image by synthesizing again the respective three-band images stored in the first image memory 22 and the second image memory 24 at the image synthesizing unit 26.

In this way, the narrow-band filters are supplementarily added to and mixed with the RGB filters having the same bandwidths as the conventional RGB, and a distribution ratio of pixels corresponding to the RGB with respect to pixels corresponding to the auxiliary bands is increased in acquisition of a multi-band point sequential image. Thereby, a multi-band image can be obtained with approximately equal resolution and sensitivity to the resolution and sensitivity of the conventional RGB camera. Accordingly, color reproducibility can be improved.

Figure 17:
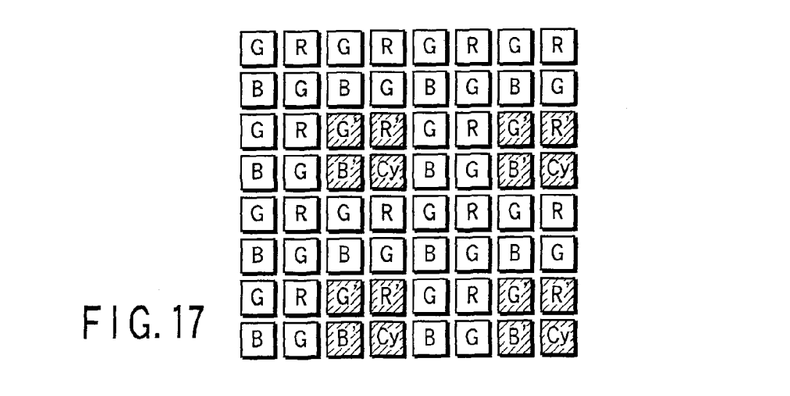
FIG. 17 is a diagram illustrating another example of filter arrangement of (a part of) the mosaic filter installed in the color CCD image capturing device shown in FIG. 14.

In FIG. 15 described above, the pixels corresponding to the G' filter among the supplementarily added R', G', and B' filters are provided twice as many as the pixels corresponding to the other filters of R' and B'. However, the present invention is not limited thereto. For example, as illustrated in FIG. 17, one of the two pixels corresponding to the G' filter may be allocated to a Cy filter so that a multispectral image having a total of seven bands is captured. In this case, the Cy filter has a different spectral transmittance characteristic from the spectral transmittance characteristic of the above-described G' filter.

Figure 18:
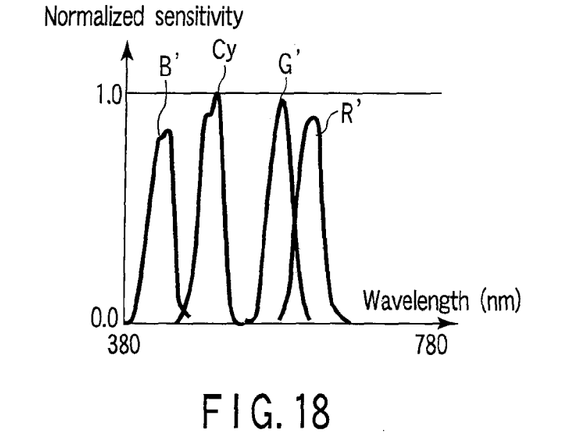
FIG. 18 is a graph representing spectral transmittance characteristics of the filters R', G', Cy, and B' shown in FIG. 17.

In the first and second embodiments described above, the three auxiliary bands other than the conventional RGB three bands have bandwidths of predetermined ranges extracted from the bandwidths of the original RGB. However, the present embodiment is not limited thereto. For example, the auxiliary bands can include a bandwidth beyond the wavelength bandwidths of the original RGB, as in the case of Cy shown in FIG. 18.

Fourth Embodiment

Figure 19:
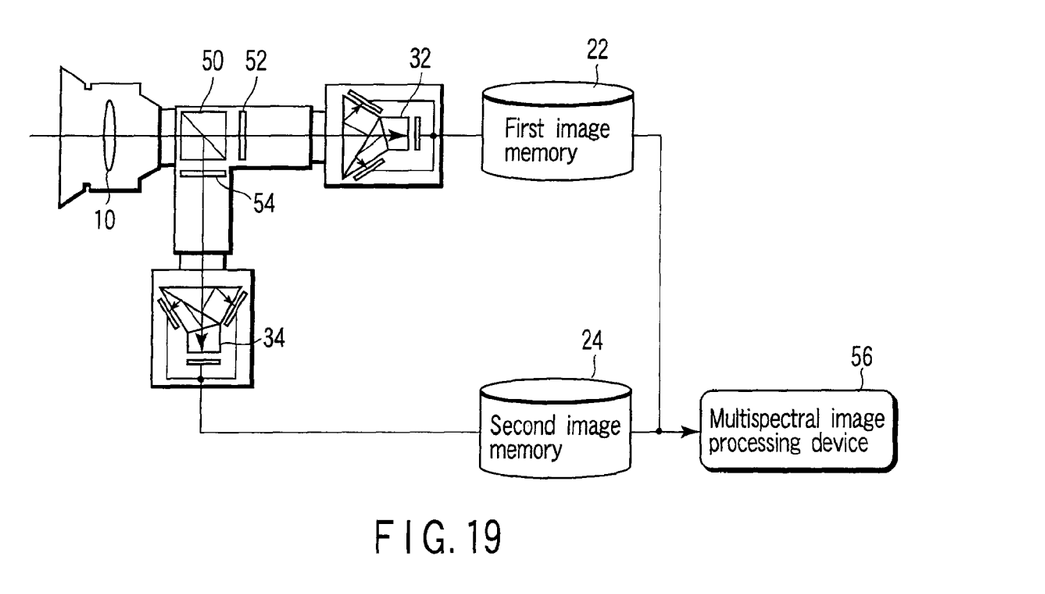
FIG. 19 is a diagram illustrating a configuration of a multispectral image capturing apparatus according to a fourth embodiment of the present invention.
Figure 20:
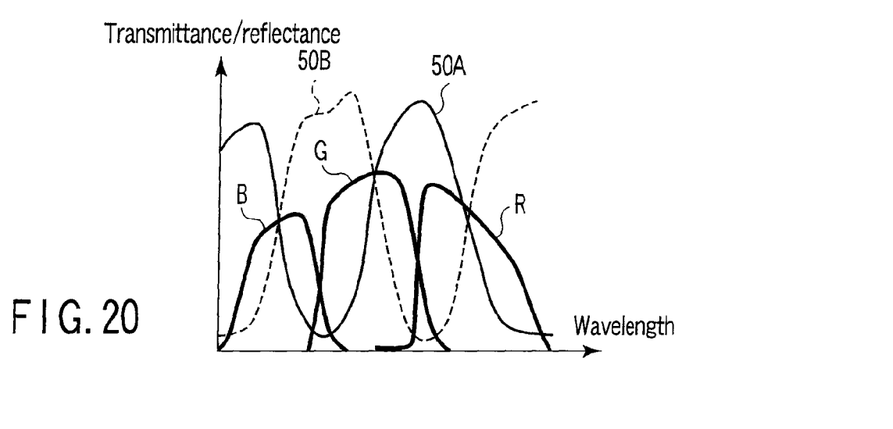
FIG. 20 is a graph representing a spectral transmittance distribution and a spectral reflectance distribution of the dichroic mirror shown in FIG. 19, and spectral characteristics of RGB individually separated by the color separation prism shown in FIG. 19.

In a multispectral image capturing apparatus according to a fourth embodiment of the present invention, as illustrated in FIG. 19, a dichroic mirror (DM) 50 that transmits and reflects light with a selected wavelength is used in place of the half mirror 12 used in the preceding embodiments, which divides the light from the subject O. In FIG. 20, a spectral transmittance distribution of the DM 50 is indicated by a black fine line 50A, while a spectral reflectance distribution of the DM 50 is indicated by a black dotted line 50B. Further, in FIG. 20, black bold lines indicate spectral characteristics of RGB individually separated by the color separation prism shown in FIG. 19. As illustrated in FIG. 20, the DM 50 has the transmittance distribution and the reflectance distribution each of which has a comb-like spectral shape.

Then, the light transmitted and reflected by the DM 50 is decomposed by the color separation prisms of the color image capturing units 32 and 34 into the RGB three bands of different narrow bandwidths, and are formed into images. Thereby, an image having six bands of the narrow bandwidths is obtained.

Figure 21:
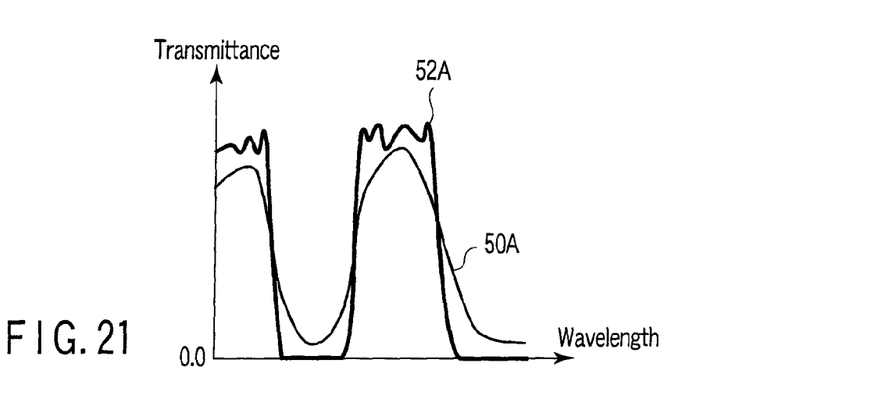
FIG. 21 is a graph representing a spectral transmittance distribution of the band-pass filter 52 shown in FIG. 19, and the spectral transmittance distribution of the dichroic mirror shown in FIG. 20.
Figure 22:
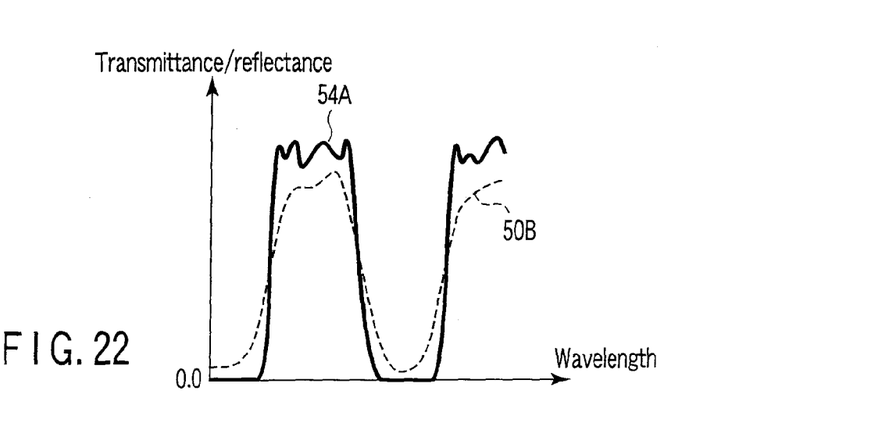
FIG. 22 is a graph representing a spectral transmittance distribution of the band-pass filter 54 shown in FIG. 19, and the spectral reflectance distribution of the dichroic mirror shown in FIG. 20.

Further, band-pass filters 52 and 54 are inserted at positions subsequent to the DM 50. The band-pass filters 52 and 54 have a spectral transmittance 52A and a spectral reflectance 54A as shown in FIGS. 21 and 22, respectively, which have comb-like spectral shapes similar to the spectral transmittance 50A and the spectral reflectance 50B of the DM 50. Thus, wavelength selectivity is intensified, and therefore, the six-band image with good wavelength separation can be obtained. In general, if an attempt is made to obtain transmittance and reflectance distributions having comb-like spectral shapes by solely using the dichroic mirror 50, wavelength selectivity cannot be much expected. Thus, as illustrated in FIG. 20, light leakage of a certain amount is caused in a non-transmission band and a non-reflection band in many cases. Therefore, improving the wavelength separation of the respective bands by placing the band-pass filters 52 and 54 of good wavelength selectivity (e.g., multilayer-film interference filters) at the positions subsequent to the DM 50, as described above, is a very effective technique for providing a multispectral camera having good color reproducibility. Further, the light loss caused by the band-pass filter 20 can be minimized by separating the wavelengths of the light from the subject O to some extent by the DM 50. Accordingly, a multi-band camera with high light efficiency can be provided.

With the above-described configuration, according to the present embodiment, the image having the six bands of the narrow bandwidths is captured, and therefore, a multispectral image with good wavelength separation can be captured. Further, a multi-band camera of a high signal-to-noise ratio can be provided. However, unlike the preceding embodiments, the multispectral image capturing apparatus according to the present embodiment cannot be directly connected to the conventional RGB connecting device 30 to check the color image equal to the ordinary RGB image. Therefore, to check the obtained image as a color image, it is necessary to perform a color conversion on the obtained image by using a multiband image processing device 56 as shown in FIG. 19.

As described above on the basis of the first to fourth embodiments, among the bands used for capturing a multispectral image, at least three bands have the spectral sensitivity characteristics of wide bandwidths similar to the conventional RGB. Further, a smaller portion of the light from the subject than the portion of the light allocated to the RGB is allocated to the other auxiliary bands of the narrow bandwidths. Thereby, the light loss is reduced, and thus it is possible to provide a multispectral image capturing apparatus capable of capturing images of the subject O with good color reproducibility, even if the subject O is moving. Furthermore, it is possible to provide a multispectral image capturing apparatus capable of directly checking an obtained image by using an ordinary RGB monitor with no need for a special converter. Moreover, if the dichroic mirror and the band-pass filter are used together, the six bands of narrow bandwidths with good wavelength separation can be obtained, and a multispectral image capturing apparatus that reduces the light loss can be provided, similarly to the above.

Fifth Embodiment

Figure 23:
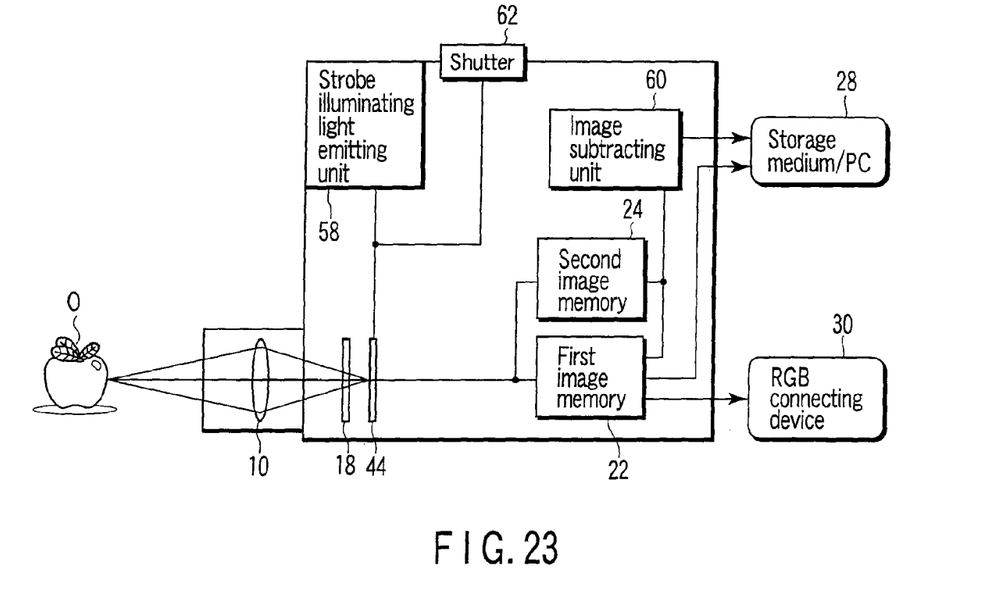
FIG. 23 is a diagram illustrating a configuration of a multispectral image capturing apparatus according to a fifth embodiment of the present invention.
Figure 24:
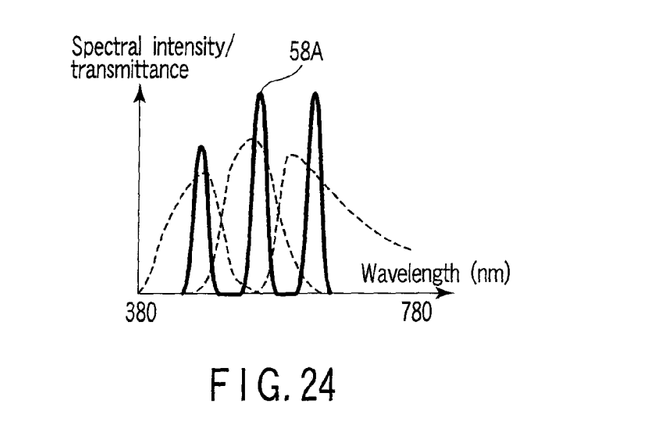
FIG. 24 is a graph representing a spectral characteristic of a light source of the strobe illuminating light emitting unit used in the multispectral image capturing apparatus according to the fifth embodiment, and spectral sensitivity characteristics of RGB three bands of the color CCD image capturing device used in the multispectral image capturing apparatus.

As illustrated in FIG. 23, a multispectral image capturing apparatus according to a fifth embodiment of the present invention includes a strobe illuminating light emitting unit 58 which includes a light source having the wavelength characteristics of three band of narrow bandwidths. Therefore, two types of images (each having three bands), i.e., an image captured with no strobe light emission (i.e., with ambient lighting) and an image captured with the strobe light emission (i.e., with ambient lighting and strobe lighting) are captured, and then a multispectral image of six bands is obtained. In this case, the light source of the strobe illuminating light emitting unit 58 is a light source, such as a white LED and fluorescent light, which has a wavelength characteristic of a comb-shaped spectral distribution including sharp peaks in the wavelength regions of the sensitivities of RGB included in the color CCD image capturing device 44. Alternatively, three types of LEDs having the wavelength characteristics of narrow bandwidths may be used. An example of an emission spectrum of the light source of the strobe illuminating light emitting unit 58 is indicated by a solid line in FIG. 24. In the figure, broken lines indicate transmittance characteristics of RGB.

The multispectral image capturing apparatus according to the present embodiment further includes an image subtracting unit 60 which subtracts the image stored in the first image memory 22 from the image stored in the second image memory 24.

Figure 25:
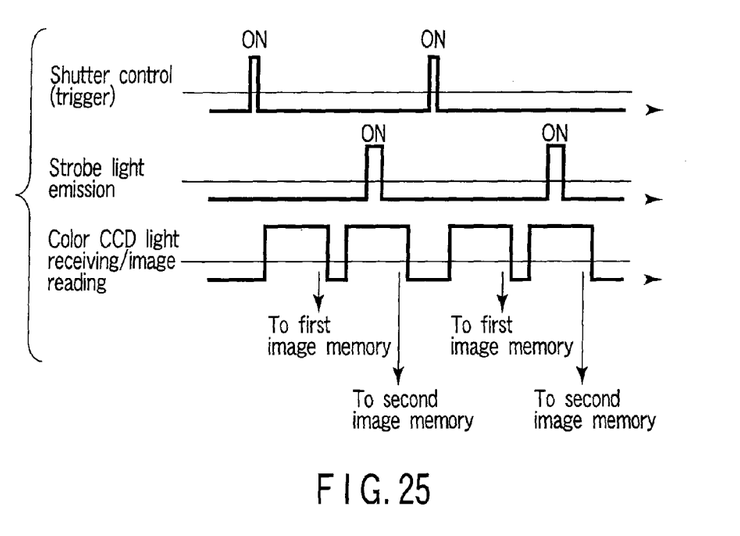
FIG. 25 is a diagram showing a timing chart illustrating a flow of an image capturing operation from shutter control to strobe light emission and light receiving and image reading by the color CCD image capturing device.

FIG. 25 is a timing chart illustrating the flow of an image capturing operation from shutter control to strobe light emission and light receiving and image reading by the color CCD image capturing device 44. That is, in the multispectral image capturing apparatus according to the present embodiment, when a shutter 62 is first pressed, the present multispectral image capturing apparatus captures an image of the subject O with no strobe light emission, i.e., only with ambient lighting, as an ordinary color image having the three bands of RGB. Then, the obtained image is stored in the first image memory 22. The image is then output to the RGB connecting device 30 as the conventional RGB image and is output to the storage medium and the external PC 28 as an image of three primary bands among the six bands. Thereafter, the subject O is illuminated in the strobe light emission state, i.e., with the ambient lighting and the strobe lighting, and the image of the subject O is captured in a similar manner as the three-band color image, and the obtained image is stored in the second image memory 24. After the image capturing operation is completed, at the image subtracting unit 60, the image previously captured with no strobe light emission (i.e., only with the ambient lighting) and stored in the first image memory 22 is subtracted from the image stored in the second image memory 24. Thereby, a three-band image of the narrow bandwidths containing only strobe components is generated. The thus generated image is output to the storage medium and the external PC 28 as an image of the three auxiliary bands. As a result, an image of a total of six bands including the three-band image containing ambient components and the three-band image containing the strobe components is obtained.

With the configuration as described above, similar effects to the effects of the preceding embodiments can be obtained by using an ordinary optical system, without using the special optical system or the filter structure used in the preceding embodiments. Further, if the three-band image stored in the first image memory 22 is input in the RGB connecting device 30, the color image of the subject O can be easily checked in a similar way as in the conventional RGB camera.

In the present embodiment, after the shutter operation is performed, the color image of the subject O is first captured with the light source of only the ambient light. Alternatively, the strobe light emission may be first performed to capture the color image of the subject O illuminated by the ambient light and the strobe light and then to capture the color image of the subject O with the light source of only the ambient light.

Sixth Embodiment

Figure 26:
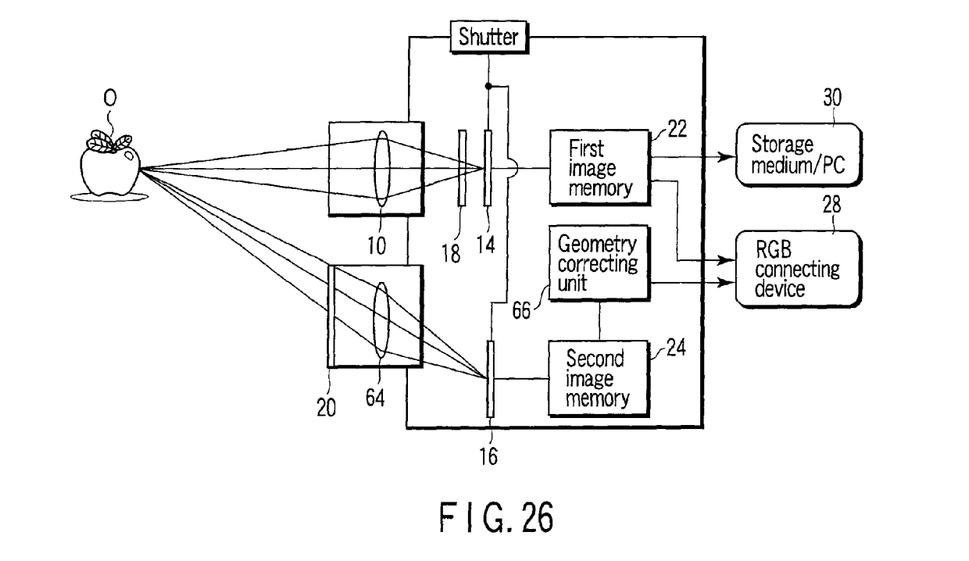
FIG. 26 is a diagram illustrating a configuration of a multispectral image capturing apparatus according to a sixth embodiment of the present invention.

A multispectral image capturing apparatus according to a sixth embodiment of the present invention is a dual-lens multispectral image capturing apparatus. The multispectral image capturing apparatus includes a color image capturing unit that captures an image of the conventional three bands of RGB, and a color image capturing unit that captures an image of three bands of narrow bandwidths and includes a lens provided with a band-pass filter having a comb-shaped spectral transmittance characteristic of the three bands of the narrow bandwidths. Thus, the multispectral image capturing apparatus obtains a six-band multispectral image from the image of the three primary bands captured by the color image capturing unit that captures the image of the conventional three bands of RGB, and the image of the three auxiliary bands captured by the color image capturing unit that captures the image of the three bands of the narrow bandwidths.

An image capturing unit at an upper position in FIG. 26 is the color image capturing unit that captures the image of the conventional three bands of RGB, and the color image capturing unit includes the lens 10, the IR-CF 18, and the color CCD image capturing device 14. Meanwhile, an image capturing unit at a lower position in FIG. 26 is the color image capturing unit that captures the image of the three bands of the narrow bandwidths, and the color image capturing unit includes a lens 64, the band-pass filter 20 placed in front of the lens 64 and having the comb-shaped spectral transmittance characteristic of the three bands of the narrow bandwidths, and the color CCD image capturing device 16. The position of the image of the three auxiliary bands of the narrow bandwidths captured by the lower image capturing unit is misaligned from the position of the conventional three-band image (captured by the upper image capturing unit) due to a parallax error. This misalignment is corrected by a geometry correcting unit 66 which is provided at a position subsequent to the second image memory 24, and a resultant image is output after the positions of the two three-band images have been aligned to each other.

With the configuration described above, similar effects to the effects of the preceding first to fourth embodiments can be obtained by using an ordinary optical system, without using the special optical system or the filter structure used in the first to fourth embodiments. Further, if the three-band image stored in the first image memory 22 is input in the RGB connecting device 30, the color image of the subject O can be easily checked in a similar way as in the conventional RGB camera.

Needless to say, the present invention is not limited to the above-described embodiments, but can be modified or applied in various ways within a scope of the gist of the present invention.

For example, the CCD image capturing device used in the above-described embodiments as an example of the image capturing device can be replaced by an X-Y address type image capturing device, such as a CMOS image capturing device. If such an image capturing device is used, high-speed reading and skip reading can be performed. Further, if a single-plate type color image capturing device is used, pixels corresponding to the same color filter can be selectively read. Therefore, high-speed processing and an inexpensive structure of the multispectral image capturing apparatus are enabled.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A single plate-type image capturing apparatus for capturing a multispectral image, comprising:
   a single plate-type image capturing device which captures an image signal including at least four bands comprising a standard RGB and at least one band other than the bands of RGB;
   a first image memory which stores an image signal including the standard RGB signals in the captured image signal of at least four bands, wherein the stored image signal is readable from the first image memory and inputtable to an RGB signal processing system; and
   a second image memory which stores an image signal including a signal of said at least one band other than the bands of RGB in the captured image signal of at least four bands, wherein the image signal including the signal of said at least one band other than the bands of RGB is synthesized with the image signal including the RGB signals stored in the first image memory, to obtain a multi-band image signal of at least four bands;
   wherein, in the image capturing device, a distribution ratio of pixels sensitive to said at least one band other than the bands of the standard RGB is smaller compared to a distribution ratio of pixels sensitive to any one of the bands of the standard RGB.

2. The apparatus according to claim 1, wherein, in the image capturing device, said at least one band other than the bands of the standard RGB has a narrower bandwidth compared to a bandwidth of any one of the bands of the standard RGB.

* * * * *